No. 884,386.

PATENTED APR. 14, 1908.

H. C. HENDRICK.
POTATO HARVESTER.
APPLICATION FILED SEPT. 10, 1906.

3 SHEETS—SHEET 1.

WITNESSES:
F. C. Gibson
John T. Schrott

INVENTOR
Henry C. Hendrick.

BY
Fred G. Dieterich
ATTORNEYS

No. 884,386. PATENTED APR. 14, 1908.
H. C. HENDRICK.
POTATO HARVESTER.
APPLICATION FILED SEPT. 10, 1906.
3 SHEETS—SHEET 2.
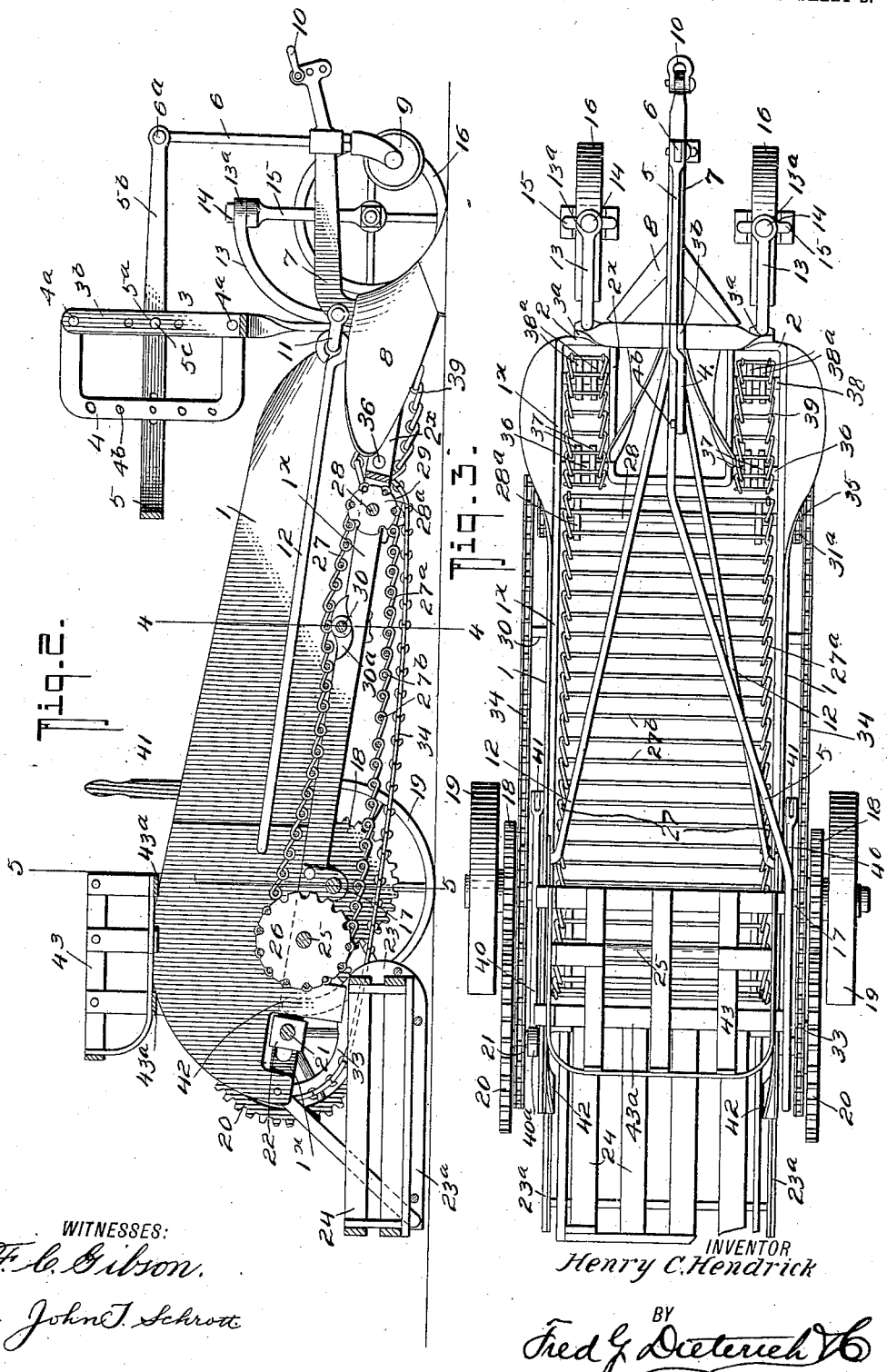
WITNESSES:
F. C. Gibson.
John T. Schrott.
INVENTOR
Henry C. Hendrick
BY
Fred G. Dieterich
ATTORNEYS No. 884,386. PATENTED APR. 14, 1908.
H. C. HENDRICK.
POTATO HARVESTER.
APPLICATION FILED SEPT. 10, 1906.

3 SHEETS—SHEET 3.

WITNESSES:
F. C. Gibson.
John T. Schrott

INVENTOR
Henry C. Hendrick.
BY
Fred G. Dieterich & Co.
ATTORNEYS

THE NORRIS PETERS CO., WASHINGTON, D. C.

UNITED STATES PATENT OFFICE.

HENRY C. HENDRICK, OF LAWRENCE, MICHIGAN.

POTATO-HARVESTER.

No. 884,386.　　　　Specification of Letters Patent.　　　Patented April 14, 1908.

Application filed September 10, 1906. Serial No. 334,060.

*To all whom it may concern:*

Be it known that I, HENRY C. HENDRICK, residing at Lawrence, in the county of Van Buren and State of Michigan, have invented certain new and useful Improvements in Potato-Harvesters, of which the following is a specification.

My invention relates to certain new and useful improvements in machines for digging, cleaning and picking potatoes, and depositing them into a crate or basket, and the invention primarily has for its object to provide a machine of this character of a very simple and effective construction that can be easily and cheaply manufactured, and which will readily and effectively serve its intended purposes.

Generically, my invention comprises a vehicle, having an adjustable plow for plowing up the ground to expose and release the potatoes, an endless conveyer coöperating with the plow to carry the potatoes to the rear of the machine, and a platform or receptacle at the rear of the machine for receiving the potatoes from the conveyer.

Means are also provided in connection with the conveyer for agitating or vibrating the same to clean the potatoes of the dirt adhering thereto when they are gathered up by the conveyer, the cleaning taking place simultaneously with the conveying operation.

My invention also includes means for throwing the conveyer mechanism out of gear at times when it is desired to draw the machine from place to place without operating the same.

With other objects in view than have been heretofore specified, my invention also comprises certain novel construction, combination and arrangement of parts, all of which will be first described in detail, and then be specifically pointed out in the appended claims, reference being had to the accompanying drawings, in which:—

Figure 1:
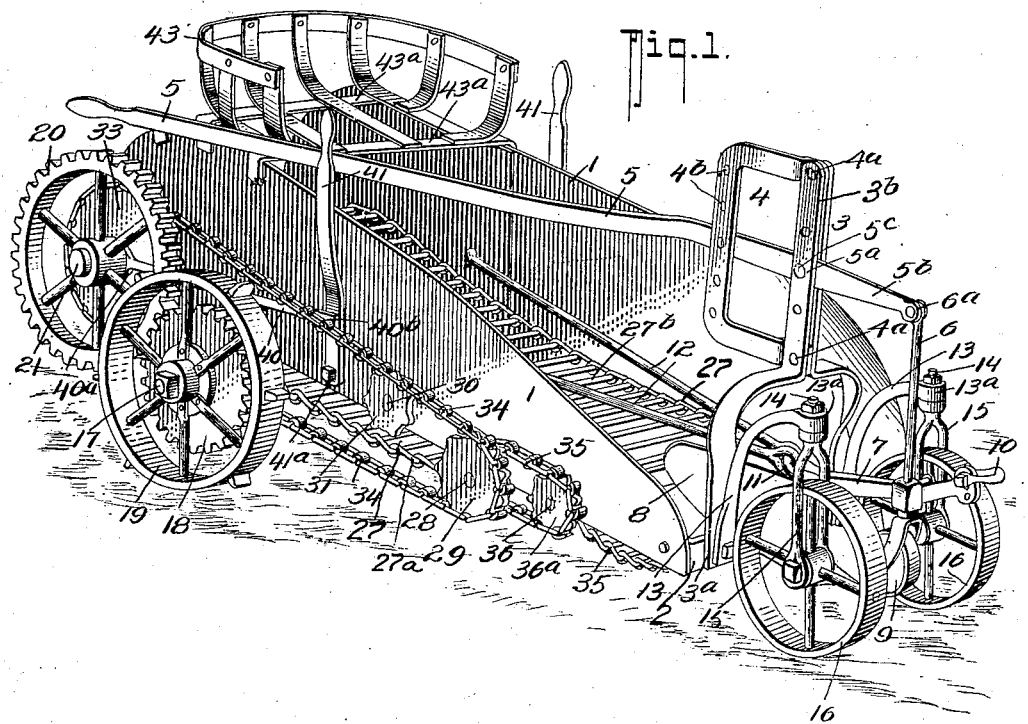
Figures 4, 5:
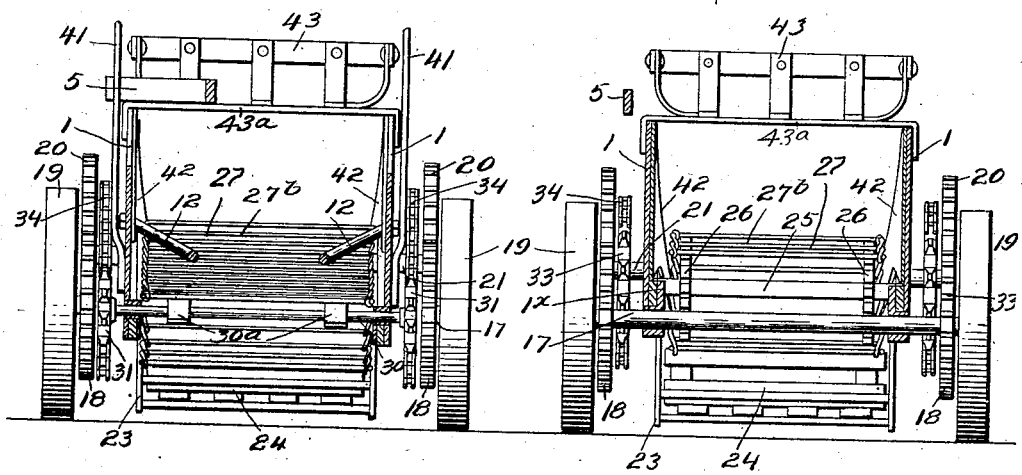
Figure 6:
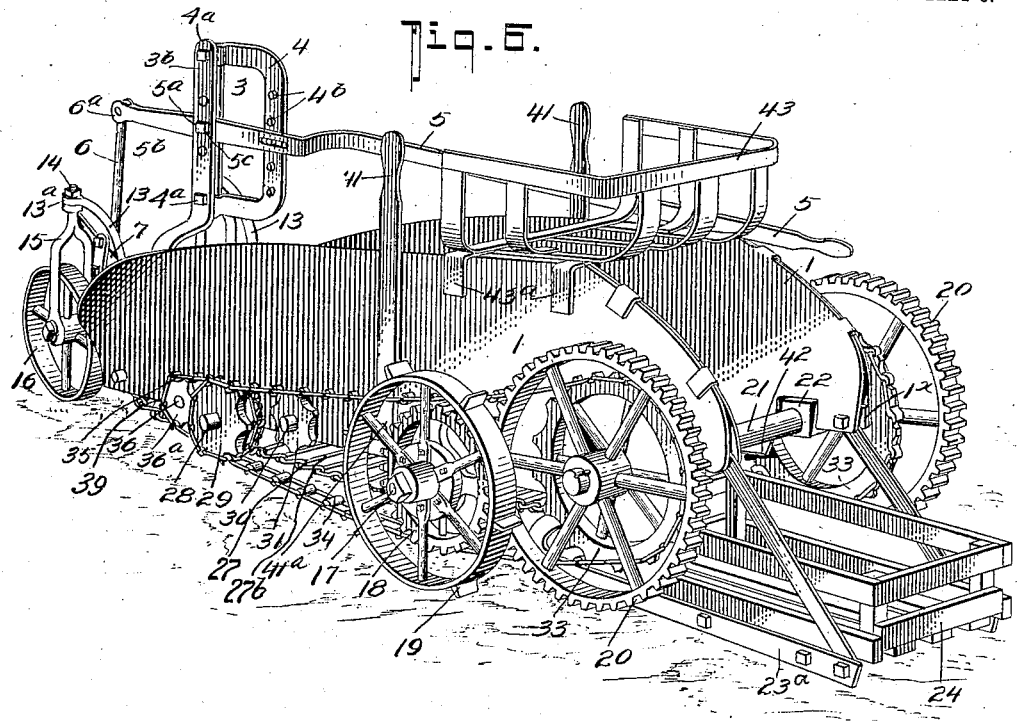
Figure 7:
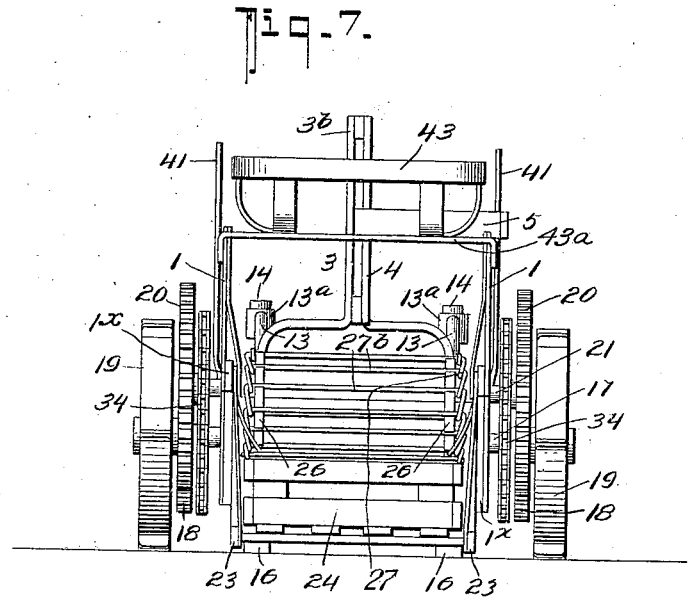

Figure 1, is a perspective view of my invention. Fig. 2, is a vertical, longitudinal view thereof. Fig. 3, is a top plan view thereof. Fig. 4, is a cross section on the line 4—4 of Fig. 2. Fig. 5, is a similar view on the line 5—5 of Fig. 2. Fig. 6, is another perspective view of my invention. Fig. 7, is a rear elevation.

Referring now to the accompanying drawings, in which like numerals and letters of reference indicate like parts in all of the figures, 1 designates the side-boards of the vehicle, the front ends of which are joined by a cross beam 2 to which the Y-frame 3 is bolted, as at $3^a$. The frame 3 includes upwardly extending support members $3^b$ between which the U-shaped rack bar 4 is bolted as at $4^a$. The bar 4 has spaced pins $4^b$ to enter the enlarged aperture in the plow controlling lever 5 that is fulcrumed between the supporting members $3^b$, as at $5^a$, and has a short projecting end $5^b$ to which a rod 6 is pivoted at $6^a$.

It should be mentioned the supporting members $3^b$ may be provided with several apertures to receive the pivot bolt $5^c$ of the lever 5 so as to allow a greater adjustment thereof. The rod 6 projects downwardly through the draft beam 7 of the plow 8 and carries a gage wheel 9, as shown. By manipulating the lever 5 on the pivot $5^c$, the rod 6 is moved up or down carrying with it the plow beam 7 and thereby altering the relative position of the plow beam and plow so that the plow will be raised off the ground as shown in Fig. 1, when the machine is being pulled over the ground and when the lever 5 is forced downwardly to elevate the rod 6. When the caster 9 engages the ground then the plow point will be extended in a plane below the surface of the ground to perform its plowing functions, thus the plow may be adjusted independently of the conveyer frame, it being understood that the rod 6 while passing through the beam 7 is nevertheless fixed thereto and while the rods 12 are locked with the plow beam yet the rear or wing portions of the plow 8, by engaging the side bars of the frame on the inner sides of the supplemental conveyers, (see Fig. 3) will prevent the plow dropping beyond the position shown in Fig. 2, but when the caster wheel 9 is on the ground the plow point can enter the same and the plowing function be continued. The plow is therefore adjusted independently of the position of the conveyer frame. In other words, the relative position of the conveyer frame is always the same owing to the supports 13 and wheels 16 and the angle of inclination of the plow point is controllable through the medium of the lever 5 and rod 6, by raising and lowering the draft portion of the plow beam.

When force is applied to pull the apparatus over the ground when the parts are in the position shown in Fig. 2, the tendency will be for the rods 12 to aline themselves with the plow beam 7, so that there will be a direct line of force from the pivot points of the rods 12 where they pass through the sides 1. The draft beam 7 has a clevis 10 secured thereto to which a cross member may be connected and to which the draft bars may be adjusted in the usual manner. The plow 8 is secured to the beam 7 in the usual manner, a second clevis 11 being connected with the beam 7 over the plow to which and to the side-boards 1, the stay rods 12 are bolted. The caster wheel frames 13 are secured to the bar 2 and have bearings 13$^a$ to receive the swivel shanks 14 of the carrying frames 15 that have the caster wheels 16 therein.

17 designates the main drive shaft that is mounted in bearings beneath the side-boards 1 and carries the drive gear wheels 18 and the drive wheels 19 keyed thereto. The gears 18 mesh with the bull gears 20 on a cross shaft 21 mounted in bearings 22 slidably held in the bar 1$^\times$ over the supplemental frame 23 secured to the side-boards 1, the frame 23 having a rearwardly projecting portion 23$^a$ to receive the crate or other receptacle 24. Intermediate the shafts 17 and 21 a conveyer shaft 25 is mounted in bearings between the side-boards 1 and this shaft 25 carries sprockets 26 around which an endless carrier 27 having chains 27$^a$ passes, the chains 27$^a$ being connected by cross spaced rods 27$^b$, as indicated. The endless carrier 27 also passes over supplemental sprockets 28$^a$ on a shaft 28, held in bearings between the side-boards, and adjacent the bar 2 and the plow 8. The conveyer 27 is driven by a sprocket 29 on the shaft 28 that is fulcrumed in bearings in the side-boards 1.

An agitator shaft 30 projects through the side-boards 1 and carries drive sprockets 31 on its ends over which the endless link chain 34 passes. The chain 34 also passes over the sprocket 29 and the sprocket 33 on the shaft 21. The agitator 30 passes within the endless conveyer belt and carries cams 30$^a$ to agitate the conveyer to release the dirt adhering to the potatoes.

36 designates a pair of shafts journaled in the supporting frame bars 1$^\times$ and the U-shaped cross beam 2 which shafts 36 project through the side-boards 1 and carry sprocket 36$^a$ over which and supplemental sprockets 31 on the shaft 30 the endless chains 35 pass. Between the bars 1$^\times$ and the parallel portion 2$^\times$ of the cross beam or bar 2, the shafts 36 carry sprocket wheels 37 over which and over sprocket wheels 38$^a$ on the supplemental shafts 38, the short endless conveyer chains 39 pass. These chains 39 are arranged on each side of the plow to receive the potatoes as they are thrown up by the plow.

The shaft 21 has its bearings 22 slidably held in the bar 1$^\times$ as before stated, and the shaft 21 also passes through bearing boxes 40$^a$ on the end of the connecting rods 40 that are fulcrumed at 40$^b$ to a pair of clutch levers 41 that are pivoted at 41$^a$ to the side-boards 1, so that the shaft 21 can be moved with its gear 20 into and out of engagement with the gears on the shaft 17. At the rear of the machine I provide baffle or chute plates 42 to guide the potatoes from the conveyer 27 into the receptacle. A seat 43 is held on the side-boards 1 by bridge pieces 43$^a$ so as to be susceptible of adjustment thereon. By reason of the short endless conveyers 39 and the endless conveyer 27 the potatoes are positively carried from the plow to the receptacle.

From the foregoing, it will be seen that in the practical operation of my invention as the machine is drawn over the field, the plow will uncover the potatoes and throw them in alinement with the conveyer which gathers them up and upon which conveyer they are then conveyed to the rear of the machine while being simultaneously agitated to relieve them of the dirt adhering thereto, and as they reach the rear of the machine the potatoes will be dumped into the crate or other receptacle, and can be conveyed therefrom when desired.

The desired adjustment of the plow can be had through the medium of the lever 5 which is bent to have its handle portion 5 extended adjacent the seat 43, it being understood that the clutch controlling levers are likewise arranged in a position adjacent the seat, so that all levers can be controlled by the operator.

From the foregoing description taken in connection with the accompanying drawings, it is thought the complete construction, operation and many advantages of my invention will be readily understood by those skilled in the art to which it appertains, and I desire it understood that numerous slight changes in the detailed construction, arrangement and design of parts may be made without departing from the scope of my invention or that of the appended claims.

What I claim is:—

1. An apparatus of the class described, comprising in combination with side-boards and a supporting frame therefor, an endless conveyer held between said side-boards, a cross bar at the front of said side-boards and having a U-shaped portion, a plow adjustably held within said U-shaped portion, a receptacle held behind the conveyer, a wheeled drive shaft, means for driving the conveyer therefrom, means for coöperatively connecting and disconnecting the conveyer drive means from the drive shaft, and supplemental conveyers at each side of the plow for coöperating with the first mentioned conveyer, substantially as shown and described.

2. An apparatus of the class described, comprising in combination with side-boards and a supporting frame therefor, an endless conveyer held between said side-boards, a cross bar at the front of said side-boards and having a U-shaped portion, a plow adjustably held within said U-shaped portion, a receptacle held behind the conveyer, a wheeled drive shaft, means for driving the conveyer therefrom, means for coöperatively connecting and disconnecting the conveyer drive means from the drive shaft, supplemental conveyers including drive shafts held at each side of the plow for coöperating with the first mentioned conveyer, and means coöperating with said supplemental conveyer drive shafts and with the first mentioned conveyer drive means for driving the supplemental conveyers, substantially as shown and described.

3. An apparatus of the class described, comprising in combination with side-boards and a supporting frame therefor, an endless conveyer held between said side-boards, a cross bar at the front of said side-boards and having a U-shaped portion, a plow held within said U-shaped portion, a wheeled drive shaft, means for driving the conveyer therefrom, and supplemental conveyers at each side of the plow for coöperating with the first mentioned conveyer, substantially as shown and described.

4. An apparatus of the class described, comprising a supporting frame including side-boards, an endless conveyer mounted therebetween and extending from the front to the rear thereof, a cross bar connecting the front ends of the side-boards, caster wheels connected with said cross bar, a plow mounted adjacent said cross bar, stay rods connecting said plow with the side-boards, said plow having a draft beam, a Y-frame secured to the cross bar, a plow adjusting lever connected with said Y-frame and with said plow beam, a wheeled drive shaft and means connecting said wheeled drive shaft with said conveyer to drive the same, substantially as shown and described.

5. An apparatus of the class described, comprising a supporting frame including side-boards, an endless conveyer mounted therebetween and extending from the front to the rear thereof, a cross bar connecting the front ends of the side-boards, caster wheels connected with said cross bar, a plow mounted adjacent said cross bar, stay rods connecting said plow with the side-boards, said plow having a draft beam, a Y-frame secured to the cross bar, a plow adjusting lever connected with said Y-frame and with said plow beam, a wheeled drive shaft means connecting said wheeled drive shaft with said conveyer to drive the same, and supplemental conveyers arranged at the side of said plow to coöperate with said first mentioned endless conveyer, and means for driving said supplemental conveyers, substantially as shown and described.

6. An apparatus of the class described, comprising a supporting frame, including side-boards, cross bars connecting the side-boards together, a plow having a draft beam held adjacent the front side-board cross bar, stay rods connecting the plow draft beam with the side-boards, caster wheel carrying frames connected with the front cross bar of the side-boards, a Y-frame also connected to said front cross bar and having a rack portion, a plow controlling lever fulcrumed on the Y-frame and having means for coöperating with the rack portion, means connecting the draft beam of the plow with said plow controlling the lever, a caster wheel secured to said last mentioned connecting means beneath the plow draft beam, an endless conveyer mounted between said side-boards and extending adjacent the rear of the plow, supplemental conveyers in each side of the plow for coöperating with the first mentioned endless conveyer and means for driving the conveyers, substantially as shown and described.

7. An apparatus of the class described, comprising a frame including side-boards, a main endless conveyer therebetween, a plow coöperatively arranged with relation to the conveyer, a drive shaft, a counter-shaft at the rear of the side-boards, gear connections between the countershaft and the wheeled drive shaft, said conveyer including a drive shaft, sprocket and chain connections between the conveyer drive shaft and the conveyer shaft, supplemental conveyers mounted at each side of the plow and geared with said main conveyer, substantially as shown and described.

8. In an apparatus of the class described, the combination with side-boards and a supporting frame therefor, an endless conveyer held between said side-boards, a cross bar at the front of said side-boards having a U-shaped portion, a plow held within said U-shaped portion, a wheeled drive shaft, means for driving the conveyer therefrom, and supplemental conveyers at each side of the plow for coöperating with the first mentioned conveyer, substantially as shown and described.

9. In an apparatus of the class described, the combination with the side-boards and a supporting frame therefor, an endless conveyer held between said side-boards, a cross bar at the front of said side-boards having a U-shaped portion, a plow held within said U-shaped portion, a wheeled drive shaft, means for driving the conveyer therefrom, supplemental conveyers at each side of the plow for coöperating with the first mentioned conveyer, said supplemental conveyers having drive shafts, and means coöperating with said supplemental drive shafts and with the first mentioned conveyer drive means for driving the supplemental conveyers, substantially as shown and described.

HENRY C. HENDRICK.

Witnesses:
A. WELLS,
F. W. POTTER.